United States Patent [19]
Giangaspero et al.

[11] 3,868,430
[45] Feb. 25, 1975

[54] PROCESS FOR THE SEPARATION OF ETHYLBENZENE FROM XYLENES

[75] Inventors: Michele Giangaspero, Monfalcone; Giorgio Tlustos, Trieste; Marino Bose, Trieste; Domenico Corsi, Trieste, all of Italy

[73] Assignee: Aquila S.p.A., Trieste-Via Dante, Italy

[22] Filed: Jan. 2, 1974

[21] Appl. No.: 429,825

[30] Foreign Application Priority Data
Dec. 29, 1972  Italy .................................. 33783/72

[52] U.S. Cl. ......... 260/674 A, 260/666 P, 260/667, 260/668 D
[51] Int. Cl. ......................... C07c 7/02, C07c 15/08
[58] Field of Search............ 260/674 A, 668 D, 667, 260/666 P

[56]  References Cited
UNITED STATES PATENTS
2,282,231  5/1942  Mattox ............................... 260/674

Primary Examiner—Paul M. Coughlan, Jr.
Assistant Examiner—C. E. Spresser

[57]  ABSTRACT

In the known process comprising hydrogenation of a mixture of ethylbenzene and xylenes, separation of the ethylcyclohexane from other hydrogenated material, and dehydrogenation of ethylcyclohexane back to ethylbenzene, the improvement consists of a partial selective hydrogenation to a conversion of ethylbenzene of between 50 and 99%, preferably between 65 and 85% and a conversion of xylenes to between 10 and 50%.

25 Claims, 2 Drawing Figures

PROCESS FOR THE SEPARATION OF ETHYLBENZENE FROM XYLENES

The present invention relates to a process for the separation of ethylbenzene from other alkylaromatic hydrocarbons containing eight carbon atoms or from one of the xylenes which are isomers of ethylbenzene.

BACKGROUND OF THE INVENTION

Mixtures of xylenes and ethylbenzene are generally obtained by catalytic reforming of gasoline; they can also be obtained by pyrolysis of gasoline (or cracking in the vapor phase) or by disproportionation of toluene.

Ortho-xylene is used principally as an intermediate in the manufacture of phthalic anhydride, which is one of the raw materials used in the manufacture of certain polyester resins and plasticizers.

There is a great commercial demand for para-xylene since it is a source of terephthalic acid, as well as of dimethyl terephthalate which are used in the manufacture of polyester resins in the form of fibers or films. The demand for meta-xylene is, in contrast, not as great; it leads to isophthalic acid, which is used in the preparation of plasticizers.

Ethylbenzene forms styrene by dehydrogenation. The process for obtaining ethylbenzene from a cut containing xylenes is less used than the process of alkylation of benzene with ethylene, because of the difficulties involved in the separation of isomers.

It is known, in fact, that the boiling points are very close, as is shown in the following Table I:

Table I

|  | Boiling Point at Atmospheric Pressure (°C.) | Crystallization Temperature |
|---|---|---|
| Ethylbenzene | 136.2 | −94.9 |
| Para-xylene | 138.3 | +13.3 |
| Meta-xylene | 139.1 | −47.4 |
| Ortho-xylene | 144.4 | −25.2 |

Ortho-xylene can be separated by distillation, from the other xylenes and from ethylbenzene, at the bottom of a column having between 100 and 150 actual plates and a reflux ratio of between 5 and 8.

Para-xylene can be separated from the other xylenes and from ethylbenzene by fractional crystallization (there are numerous processes in existence) or by selective adsorption on molecular sieves.

The separation of ethylbenzene from xylenes is very expensive, since it requires a superfractionation apparatus having between 300 and 400 actual plates with a reflux ratio above 25.

U.S. Pat. No. 2,282,231 describes a process in which xylenes and ethylbenzene are hydrogenated prior to separation by distillation of ethylcyclohexane and naphthenes corresponding to the xylenes. Ethylcyclohexane is then dehydrogenated to ethylbenzene, while the other naphthenes can be subjected to reforming, for example. The interest in this process resides in that there is a greater difference between the boiling points of ethylcyclohexane and the naphthenes than there is between the boiling points of ethylbenzene and the xylenes. This is particularly true when the mixture to be hydrogenated does not contain ortho-xylene and which therefore does not form 1,2-dimethylcyclohexane. In Table II below are shown the boiling points, at atmospheric pressure, of the alkylaromatic hydrocarbons containing eight carbon atoms and the corresponding naphthenic hydrocarbons.

Table II

| Ethylbenzene | 136.2°C. | Ethylcyclohexane | | 131.8°C. |
|---|---|---|---|---|
| Para-xylene | 138.3°C. | 1,4-Dimethylcyclohexane | | |
| Meta-xylene | 139.1°C. | | Trans | 119.2°C |
| Ortho-xylene | 144.4°C. | | Cis | 124.3°C. |
| | | 1,3-Dimethylcyclohexane | | |
| | | | Trans | 124.4°C. |
| | | | Cis | 120.1°C. |
| | | 1,2-Dimethylcyclohexane | | |
| | | | Trans | 123.3°C. |
| | | | Cia | 129.6°C. |

SUMMARY OF THE INVENTION

The object of the present invention is to provide a process for the separation of ethylbenzene from xylenes which will be more economical than the known processes and will not require superfractionation.

The process perfected by the applicants comprises a partial hydrogenation of the mixture from which it is desired to separate ethylbenzene, in contrast to the practical processes known to date, which comprise a complete hydrogenation. This partial hydrogenation leads to a subsequent separation of ethylcyclohexane from the naphthenes and the non-hydrogenated alkyl aromatic hydrocarbons, while complete hydrogenation leads to a subsequent separation of ethylcyclohexane only from other naphthenes.

The present invention has as its object a process for the separation of ethylbenzene from a mixture consisting essentially of ethylbenzene and xylenes, comprising the following successive steps:

separation of a fraction containing essentially the ortho-xylene present in the mixture;

catalytic hydrogenation of the fraction containing, among other constituents, ethylbenzene, after eventually separating a fraction containing essentially the para-xylene;

separation by distillation of the thus obtained ethylcyclohexane from the other constituents of the mixture obtained after hydrogenation;

the catalytic dehydrogenation of the ethylcyclohexane into ethylbenzene;

said process being characterized in that:

the catalytic hydrogenation of the fraction containing ethylbenzene, among other constituents, is partial, the conversion of ethylbenzene into ethylcyclohexane being limited to a value between 50 and 99% of the ethylbenzene charged into the hydrogenation reactor, and the conversion of the xylenes being between 10 and 50% of the xylenes charged into said reactor;

the separation by distillation of the ethylcyclohexane from the other constituents of the mixture obtained after partial hydrogenation comprises two steps: a first step in which the non-hydrogenated xylenes are separated from the hydrogenated material and a second step in which the ethylcyclohexane and the non-hydrogenated ethylbenzene are separated from the rest of the hydrogenated material.

By partial hydrogenation is meant a hydrogenation which is not carried out to a complete conversion of the aromatic hydrocarbons.

It is known that the kinetics of the hydrogenation reactions of the different alkyl aromatic hydrocarbons having eight carbon atoms are not identical: ethylbenzene is more rapidly hydrogenated than xylenes. The process according to the invention comprises a partial hydrogenation of the charge and thus preferentially of ethylbenzene which will be designated by the expression "selective hydrogenation of ethylbenzene".

BRIEF DESCRIPTION OF THE DRAWINGS

The two figures in the drawing are not intended to be limiting; they represent methods of carrying out the process according to the invention for the separation of ethylbenzene from meta-xylene, in which.

DESCRIPTION OF THE PREFERRED EMBODIMENTS

Figure 1:
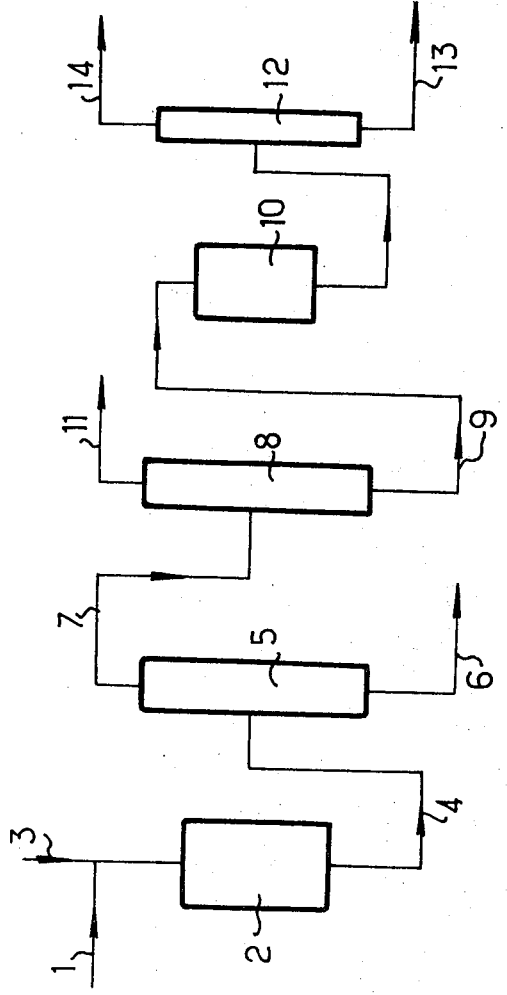
FIG. 1 is a simplified scheme for the process comprising hydrogenation in a single stage.

In order to obtain the best possible selectivity, it is preferable not to carry out the hydrogenation under severe conditions. In addition, it is not necessary to completely hydrogenate the ethylbenzene present in the mixture of aromatic hydrocarbons. In fact, the applicants have found evidence of the existence of an azeotropic mixture containing 86.1% by weight of ethylcyclohexane and 13.9% by weight of ethylbenzene, which facilitates the separation of ethylbenzene from the non-hydrogenated xylenes, the boiling point of this azeotrope (131.6°C.) being very close to that of ethylcyclohexane (131.8°C.).

The selective hydrogenation of the mixture containing ethylbenzene is preceded by the separation of the ortho-xylene by known methods of fractional distillation, when the mixture contains this isomer. This selective hydrogenation can be effected according to conventional methods; thus, a catalyst containing platinum or nickel coated on alumina or silica or on another support may be used. Other non-isomerizing catalysts may be used equally well, such as those containing chromium, molybdenum, copper, cobalt or palladium.

The selective hydrogenation is effected continuously: the temperature is generally between 80° and 230°C., preferably between 140° and 180°C., the pressure is between 0.5 and 15 atmospheres, preferably between 0.5 and 5 atmospheres. The hourly space velocity of the liquid charge is between 0.1 and 10 volumes, preferably between 0.3 and 3 volumes per volume of catalyst per hour. The reaction takes place in the presence of 0.3 to 10 moles, preferably 0.5 to 3 moles of hydrogen per mole of aromatic hydrocarbons. The invention does not reside in any particular hydrogenation catalyst, but in the fact that the hydrogenation is purposely only partial. The conversion of ethylbenzene present in the initial mixture is generally between 50 and 99%, while the conversion of the other xylenes is between 10 and 50%.

The selective hydrogenation can be effected in one or more stages. The conversion of ethylbenzene contained in the charge in a single stage hydrogenation can be between 50 and 90% and preferably 65 and 85%. In the case of a two-stage hydrogenation, it will comprise between 50 and 90% and preferably between 65 and 85% in the first stage, then the total conversion after the second stage will be between 75 and 99%, preferably between 88 and 98%.

Hydrogenation in two stages permits the recovery, per pass, of a larger amount of ethylbenzene than can be recovered in a process comprising only one stage of hydrogenation (of equivalent purity); the quantity of recovered non-hydrogenated xylene is less when the selective hydrogenation is effected in two stages than when it comprises only one stage; on the other hand, the level of purity of the non-hydrogenated xylenes is higher in the case of a two stage hydrogenation.

The separation of ethylcyclohexane from the other constituents after hydrogenation comprises two stages: a first stage consists of separating non-hydrogenated xylenes from the rest of the hydrogenated material which nevertheless contains a little ethylbenzene; a second stage consists of separating ethylcyclohexane, containing a little ethylbenzene, from the naphthenes formed by hydrogenation of xylenes. This can be effected by sucessive distillations.

The dehydrogenation of ethylcyclohexane can be effected with a non-isomerizing catalyst containing platinum or nickel deposited on alumina neutralized by an alkali metal such as sodium, potassium or lithium, or another non-acidic support. Other non-isomerizing catalysts containing one or more metals of group VIII may also be used. The dehydrogenation is effected continuously at a temperature between 280° and 450°C. and preferably between 320° and 380°C., at a pressure between 1 and 20 atmospheres and a space velocity of between 0.5 and 5 volumes of liquid charge per volume of catalyst per hour. It is known that the dehydrogenation of ethylcyclohexane can be effected with a very high conversion near 100%, without the occurrence of undesirable amounts of secondary cracking and isomerization reactions.

Referring first to FIG. 1:

A charge consisting of meta-xylene (75%) and ethylbenzene (25%) is introduced through line 1 into a selective hydrogenation reactor 2, into which hydrogen is also introduced through line 3. Such a charge can be obtained by the following successive operations: catalytic reforming of naphtha, extraction of aromatic hydrocarbons (extractive distillation with sulfolane for example), separation of the aromatic $C_8$ cut by fractionation, separation of the ortho-xylene at the bottom of the distillation tower, separation of para-xylene by selective adsorption on molecular sieves. The hydrogenation is effected by a catalyst containing 45% of nickel carried on a support consisting of silica (15%) and alumina (25%), neutralized with sodium oxide (0.3%). The operating conditions are regulated in such a manner as to obtain a conversion of 71% for ethylbenzene; about 17% of the meta-xylene is converted to 1,3-dimethylcyclohexanes.

The hydrogenated material is transferred through line 4 into an apparatus 5 for separation by distillation, whose bottom has a temperature of 138°C. and whose top a temperature of 129°C.; it has 90–110 real plates and a reflux ratio equal to 4.5–6.5 with respect to the charge; thus, all of the non-hydrogenated meta-xylene is separated by line 6 from the rest of the hydrogenated material which passes from the top of the column through line 7 and is introduced into a second separation apparatus 8, whose bottom is maintained at a temperature of 131°C. and the top of a temperature of 122°C; it has 70–90 real plates and a reflux ratio equal to 4–6 with respect to the charge. Thus ethylcyclohexane and a little ethylbenzene are separated and transferred by line 9 to a dehydrogenation reactor 10 containing a non-isomerizing catalyst consisting of platinum (0.75%) carried on an alumina support neutralized with sodium. The more volatile naphthenes are transferred by line 11 to a reforming unit for example. The conversion of ethylcyclohexane is practically complete.

Ethylbenzene is separated from hydrogen in apparatus 12 (lines 13 and 14 respectively).

Figure 2:
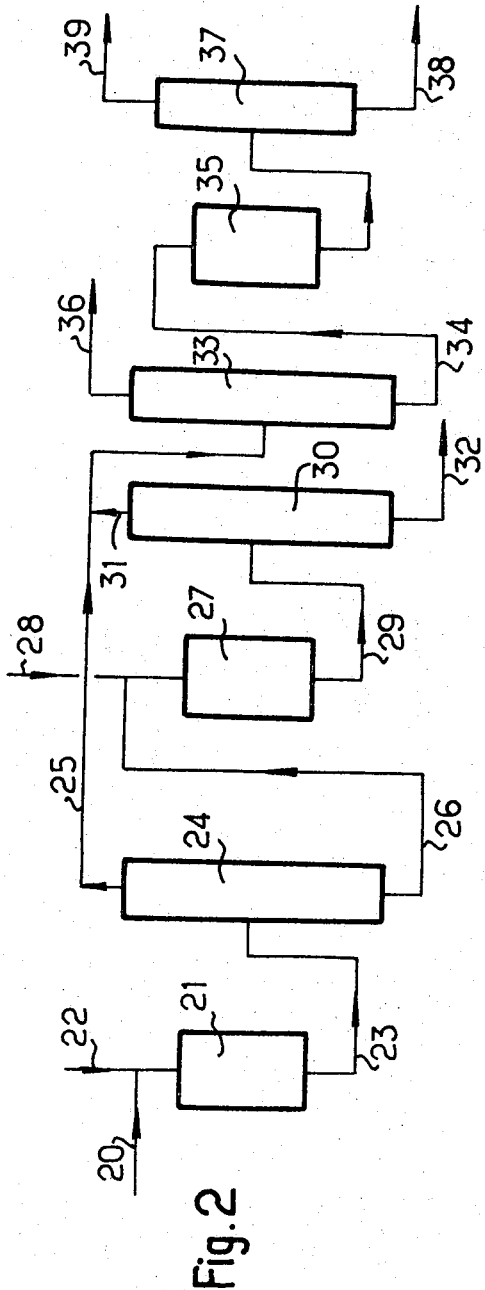
FIG. 2 is a simplified scheme for the process comprising hydrogenation in two stages.

In the case of FIG. 2, an identical charge to that described in connection with FIG. 1 is introduced by line 20 into a first partial hydrogenation reactor 21 fed by hydrogen through line 22 and containing the same catalyst as in reactor 2 of FIG. 1. The conversion of ethylbenzene is equal to 71%, that of meta-xylene being about 17%.

The hydrogenated material is transferred by line 23 into an apparatus 24 for separation by distillation, whose bottom is maintained at a temperature of 138°C. and the top at 129°C.; it has 90–110 real plates and a reflux ratio of 4.5–6.5 with respect to the charge. Thus, the naphthenes and a little non-hydrogenated ethylbenzene are separated at the top by line 25 from the bottoms consisting for the most part of non-hydrogenated meta-xylene and a little ethylbenzene; the bottoms are introduced by line 26 into a second partial hydrogenation reactor 27, into which hydrogen is introduced by line 28. The hydrogenation is continued until the total conversion of ethylbenzene present in the initial charge is equal to 91%; the total conversion of meta-xylene being equal to 31%. The hydrogen is conducted by line 29 into an apparatus 30 for separation by distillation, whose bottom is maintained at a temperature of 138°C. and the top at 129°C.; it has 90–110 real plates and a reflux ratio of 4.5–6.5. Thus the naphthenes are separated at the top through line 31 from the bottoms, recovered through line 32, and consisting of the non-hydrogenated meta-xylene containing a little ethylbenzene; nevertheless, the meta-xylene has a purity at least equal to 96% and can consequently be used as such, when this degree of purity is sufficient. Lines 25 and 31 lead to an apparatus 33 for separation by distillation, whose bottom is maintained at a temperature of 131°C. and the top at 122°C.; it has 70–90 real plates and a reflux ratio equal to 4–6. Thus the ethylcyclohexane and a little ethylbenzene are separated from the naphthene and transferred through line 34 to a dehydrogenation reactor 35, while the naphthenes are transferred through line 36 to a reforming unit, for example. The dehydrogenation of ethylcyclohexane takes place with high conversions and without secondary reactions. The ethylbenzene is separated from the hydrogen in apparatus 37 (through lines 38 and 39, respectively).

The purity of the ethylbenzene recovered from line 38 is equal to or greater than about 99.6%.

There are not shown in FIG. 2 the possibilities for recycling fractions very rich in meta-xylene from lines 26 and 32 to reactors 21 and 27. These possibilities exist and permit further increasing the purity of the meta-xylene recovered from line 32. Thus, it is possible to recycle a part of the bottoms of column 30 (line 32) into line 26, only, or by recycling simultaneously a part of the bottoms of column 24 (line 26) into line 20; it is also possible to recycle only, a part of the bottoms of column 24 (line 26) into line 20; or only a part of the bottoms of column 30 (line 32) into line 20.

When the charge subjected to hydrogenation only contains meta-xylene and ethylbenzene, the process described with reference to FIG. 2 allows for the simultaneous production of ethylbenzene and meta-xylene. The recovery of meta-xylene is partial, considering that only the meta-xylene which has not been hydrogenated is recovered from line 32.

The charge subjected to hydrogenation in reactors 2 and 21, respectively in FIGS. 1 and 2, does not contain para-xylene; but it could contain it, without modifying the process of the invention: through lines 6 and 32 (respectively in FIGS. 1 and 2), a mixture of meta-xylene and para-xylene would be recovered, which would be subjected to an extraction of the para-xylene; through lines 11 and 36 (respectively in FIGS. 1 and 2), a mixture of naphthene containing 1,4-dimethylcyclohexane would be recovered.

The invention is illustrated in addition by the following non-limiting examples.

EXAMPLE I

This example relates to the selective catalytic hydrogenation phase.

Catalysts $C_1$ to $C_4$ were successively studied, their properties being listed in Table III below:

TABLE III

| Catalyst | % Ni | % other constituents | | Support | Specific Surface m²/g |
|---|---|---|---|---|---|
| $C_1$ | 45 | Na$_2$O | (0.3 %) | Al$_2$O$_3$ (25 %) | 200–230 |
| $C_2$ | 10–11 | Cu | (3 %) | SiO$_2$ (15 %)<br>SiO$_2$ (65 %) | 120–150 |
| $C_3$ | 8 | Cr<br>Cu | (0.2%)<br>(2 %) | SiO$_2$ | 110 |
| $C_4$ | 60–54 | Cr | (0.7 %) | Kieselguhr | 120 |
| $C_5$ | 58 | — | — | Alumina | 125 |
| $C_6$ | — | Pt<br>Li<br>Cl | (0.75 %)<br>(0.5 %)<br>(0.2 %) | Alumina | 200 |

These catalysts are first subjected to reduction at 350°C. with a current of hydrogen.

A mixture of a charge consisting of 75% of meta-xylene and 25% ethylbenzene and hydrogen was passed over 150 cm³ of catalyst in the presence of hydrogen.

The operating conditions as well as the results of the runs are shown in Table IV.

The following expressions are defined as follows:

$\phi_{EB}$ = conversion of ethylbenzene =

$$= 1 - \frac{\text{Quantity of ethylbenzene leaving the reactor}}{\text{Quantity of ethylbenzene entering the reactor}}$$

$\phi_{MX}$ = conversion of meta-xylene =

$$= 1 - \frac{\text{Quantity of meta-xylene leaving the reactor}}{\text{Quantity of ethylbenzene entering the reactor}}$$

S = Selectivity into ethylcyclohexane = $\phi EB/\phi MX$

TABLE IV

| Run | Catalyst | Pressure (bars) | Temp. °C. | Hourly Space Velocity VVH | EB | MX | S | H₂/HC (moles) |
|---|---|---|---|---|---|---|---|---|
| 1 | $C_1$ | 1 | 175 | 0.5 | 71 | 17 | 4.18 | 1.5 |
| 2 | $C_1$ | 1 | 174 | 0.3 | 76 | 22 | 3.40 | 1.1 |
| 3 | $C_1$ | 1 | 160 | 1.0 | 51 | 10 | 5.10 | 1.1 |
| 4 | $C_2$ | 1 | 165 | 1.0 | 80 | 34 | 2.36 | 2.2 |
| 5 | $C_3$ | 1 | 170 | 2.0 | 58 | 19 | 3.05 | 2.2 |
| 6 | $C_4$ | 1 | 170 | 0.4 | 64 | 15 | 4.28 | 1.1 |
| 7 | $C_5$ | 1 | 153 | 1.0 | 67 | 15 | 4.5 | |
| 8 | $C_6$ | 4 | 180 | 0.5 | 56 | 21 | 2.6 | |

This example shows that the partial hydrogenation can be effected with a satisfactory selectivity using non-isomerizing catalysts under the following reaction conditions:

| | |
|---|---|
| temperature | 150–180°C. |
| space velocity (VVH) | 0.3–2 |
| ratio H₂/aromatic hydrocarbons | 1–3 (in moles) |
| pressure | 1–5 atmospheres |

EXAMPLE II

This example relates to the separation of ethyl cyclohexane from the mixture obtained after selective hydrogenation.

A charge whose composition is given in Table V below was fractionated in 2 distillation columns having 50 real plates in series.

The conditions were as follows:

| | |
|---|---|
| - temperature at the top of the second column | 128°C. |
| - temperature at the bottom of the column | 140°C. |
| - pressure | atmospheric |
| - reflux ratio with respect to the charge | 6/1 |

Table V shows the compositions of the charge and of the overhead and bottoms fractions.

TABLE V

| Compounds | Material Balance (g) | | | Composition (%) | | |
|---|---|---|---|---|---|---|
| | charge | overhead | bottoms | charge | overhead | bottoms |
| 1,3-dimethyl-cyclohexane | 50.80 | 50.69 | 0.11 | 12.70 | 38.10 | 0.04 |
| ethylcyclohexane | 70.80 | 70.00 | 0.80 | 17.70 | 52.53 | 0.30 |
| ethylbenzene | 29.20 | 12.21 | 16.99 | 7.30 | 9.16 | 6.37 |
| meta-xylene | 249.20 | 0.28 | 248.92 | 62.30 | 0.21 | 93.29 |
| TOTAL | 400.00 | 133.18 | 266.82 | 100.00 | 100.00 | 100.00 |

The overhead of the fractionation above was fractionated with a fractionating system having 90 plates under the following conditions:

| | |
|---|---|
| - temperature at the head of the column | 121.5°C. |
| - temperature at the bottom of the column | 134°C. |
| - pressure | atmospheric |
| -reflux ratio with respect to the charge | 4.5/1 |

In Table VI are listed the composition of the charge and of the overhead and bottoms fractions.

TABLE VI

| Compounds | Material Balance (g) | | | Composition (%) | | |
|---|---|---|---|---|---|---|
| | charge | overhead | bottoms | charge | overhead | bottoms |
| 1,3-dimethyl cyclohexane | 50.69 | 50.69 | — | 38.10 | 99.18 | — |
| ethylcyclohexane | 70.00 | 0.35 | 69.65 | 52.53 | 0.68 | 84.90 |
| ethylbenzene | 12.21 | 0.06 | 12.15 | 9.16 | 0.14 | 14.80 |

TABLE VI—Continued

| Compounds | Material Balance (g) | | | Composition (%) | | |
|---|---|---|---|---|---|---|
| | charge | overhead | bottoms | charge | overhead | bottoms |
| meta-xylene | 0.28 | — | 0.28 | 0.21 | — | 0.30 |
| TOTAL | 133.18 | 51.10 | 82.08 | 100.00 | 100.00 | 100.00 |

EXAMPLE III

This example relates to the dehydrogenation of ethylcyclohexane.

Pure ethylcyclohexane was dehydrogenated in a pilot plant unit, the reaction conditions being as follows:

| | |
|---|---|
| - catalyst | 30 g. of platinum catalyst neutralized with potassium |
| - VVH | 1 |
| - pressure | 3.5 atmospheres |
| - H₂/hydrocarbons | 1 (in moles) |
| - temperature | 380°C. |

The results are listed in the table below.

| Compounds | charge | Reactor Effluent |
|---|---|---|
| light paraffins | — | 0.85 |
| ethylcyclohexane | 100.00 | 8.06 |
| ethylbenzene | — | 91.07 |
| meta-,para-xylenes | — | — |
| others | — | 0.02 |
| TOTAL | 100.00 | 100.00 |

The selectivity of the dehydrogenation (91.07/[100−8.06]0= 99.3%) is therefore very satisfactory. The conversion of ethylcyclohexane (100−8.06 = 91.94%) although very high is not complete. That does not constitute, in fact, any disadvantage, particularly, when ethylbenzene is ultimately dehydrogenated into styrene, the ethylcyclohexane which it contains also undergoes dehydrogenation into styrene.

EXAMPLE IV

This example also relates to the dehydrogenation of ethylcyclohexane.

Over 100 g. of catalyst having the following characteristics:

| | |
|---|---|
| support | alumina |
| - platinum content | 0.75% |
| - lithium content | 0.50% |
| - arsenic content | 0.36% |
| - chlorine content | 0.60% |
| specific surface | 200 m²/g | ethylcyclohexane was passed under the following conditions:

| | |
|---|---|
| temperature | 350°C. |
| pressure | 3.3 atmospheres |
| VVH | 1 | ratio H₂/hydrocarbons (in moles) : 1

The results obtained are given in Table VIII below:

| Compounds | Charge | Effluent | |
|---|---|---|---|
| light paraffins | — | 2.04 | |
| ethylcyclohexane | 100 | 2.04 | |
| ethylbenzene | — | 97.51 | |
| xylenes | — | 0.16 | |
| others | — | 0.29 | (toluene) |

This corresponds to a selectivity of 99.5% and a conversion of 97.96%, which is very satisfactory.

We claim:

1. In a process for separation of ethylbenzene from a mixture comprising essentially ethylbenzene and xylenes comprising the successive steps of:
   separating the mixture into a fraction containing essentially the ortho-xylene present in the mixture, a fraction containing essentially the para-xylene and a fraction containing ethylbenzene,
   catalytically hydrogenating the fraction containing ethylbenzene to form a mixture containing ethylcyclohexane
   separating, by distillation, the ethylcyclohexane from the hydrogenation mixture, and
   catalytically dehydrogenating the ethylcyclohexane into ethylbenzene,
   the improvement which comprises the steps of
   carrying out the catalytic hydrogenation partially and selectively until the conversion of ethylbenzene into ethylcyclohexane is between 50 and 99% of the ethylbenzene subjected to hydrogenation, the conversion of xylenes being between 10 and 50% of the xylenes subjected to hydrogenation,
   separating the non-hydrogenated xylenes from the partially hydrogenated mixtures and
   separating the ethylcyclohexane and the non-hydrogenated ethylbenzene from the remainder of the hydrogenated mixture.

2. In a process for separation of ethylbenzene from a mixture comprising essentially ethylbenzene, para-xylene and meta-xylene comprising the successive steps of:
   separating a fraction containing essentially the para-xylene,
   catalytically hydrogenating the mixture remaining after separation of the para-xylene to form a mixture containing ethylcyclohexane,
   separating, by distillation, the ethylcyclohexane from the other constituents of the hydrogenation mixture, and
   catalytically dehydrogenating the ethylcyclohexane into ethylbenzene,
   the improvement which comprises
   carrying out the catalytic hydrogenation partially and selectively until the conversion of ethylbenzene into ethylcyclohexane is between 50 and 99% of the ethylbenzene subjected to hydrogenation, the conversion of meta-xylene being between 10 and 50% of the meta-xylene subjected to hydrogenation,
   separating the non-hydrogenated xylenes from the partially hydrogenated mixture and
   separating the ethylcyclohexane and the non-hydrogenated ethylbenzene from the remainder of the hydrogenated mixture.

3. In a process for the separation of ethylbenzene from a mixture comprising essentially ethylbenzene and meta-xylene comprising the successive steps of:

catalytically hydrogenating the mixture to form a mixture containing ethylcyclohexane, separating, by distillation, the ethylcyclohexane from the other constituents of the hydrogenated mixture, and catalytically dehydrogenating ethylcyclohexane to ethylbenzene, the improvement which comprises carrying out the catalytic hydrogenation partially and selectively until the conversion of ethylbenzene into ethylcyclohexane is between 50 and 99% of the ethylbenzene subjected to hydrogenation, the conversion of meta-xylene being between 10 and 50% of the meta-xylene subjected to hydrogenation;

separating the non-hydrogenated meta-xylene from the partially hydrogenated mixture and separating the ethylcyclohexane and the non-hydrogenated ethylbenzene from the remainder of the hydrogenated mixture.

4. The improvement according to claim 1 wherein the selective catalytic hydrogenation is carried out in a single step until the conversion of the ethylbenzene is between 50 and 90%.

5. The improvement according to claim 2 wherein the selective catalytic hydrogenation is carried out in a single step until the conversion of the ethylbenzene is between 50 and 90%.

6. The improvement according to claim 3 wherein the selective catalytic hydrogenation is carried out in a single step until the conversion of the ethylbenzene is between 50 and 90%.

7. The improvement according to claim 4 wherein the conversion is between 65 and 85%.

8. The improvement according to claim 5 wherein the conversion is between 65 and 85%.

9. The improvement according to claim 6 wherein the conversion is between 65 and 85%.

10. The improvement according to claim 1 wherein the selective catalytic hydrogenation is carried out in two steps: the charge of the first step being composed of the initial mixture, the charge of the second step being composed of the non-hydrogenated xylenes and a little ethylbenzene separated by distillation from the first step of the hydrogenation.

11. The improvement according to claim 2 wherein the selective catalytic hydrogenation is carried out in two steps: the charge of the first step being composed of the initial mixture, the charge of the second step being composed of the non-hydrogenated xylenes and a little ethylbenzene separated by distillation from the first step of the hydrogenation.

12. The improvement according to claim 3 wherein the selective catalytic hydrogenation is carried out in two steps, the charge of the second hydrogenation step being composed of the non-hydrogenated meta-xylene and a little ethylbenzene from the first step of the hydrogenation.

13. The improvement according to claim 10 which further comprises distilling the hydrogenated material from the second step of the hydrogenation principally to separate the non-hydrogenated xylenes from the hydrogenated material, combining the remainder of the hydrogenated material from said distillation with the remainder of the hydrogenated material from the first step of the hydrogenation and distilling said combined materials to separate the ethylcyclohexane and the ethylbenzene which constitute the dehydrogenation charge.

14. The improvement according to claim 11 which further comprises distilling the hydrogenated material from the second step of the hydrogenation principally to separate the non-hydrogenated xylenes from the hydrogenated material, combining the remainder of the hydrogenated material from said distillation with the remainder of the hydrogenated material from the first step of the hydrogenation and distilling said combined materials to separate the ethylcyclohexane and the ethylbenzene which constitute the dehydrogenation charge.

15. The improvement according to claim 12 which further comprises distilling the hydrogenated material from the second step of the hydrogenation principally to separate the non-hydrogenated meta-xylene from the hydrogenated material combining the remainder of said hydrogenated material from said distillation with the remainder of the hydrogenated material from the first step of the hydrogenation and distilling said combined materials to separate the ethylcyclohexane and the ethylbenzene which constitute the dehydrogenation charge.

16. The improvement according to claim 15 which further comprises recycling a part of the fraction containing principally non-hydrogenated meta-xylene from the hydrogenated material of the second step back into the second step of hydrogenation.

17. The improvement according to claim 12 which further comprises recycling a part of the fraction containing non-hydrogenated meta-xylene and a little ethylbenzene from the first step of hydrogenation back to the first step of hydrogenation.

18. The improvement according to claim 16 which further comprises recycling a part of the fraction containing non-hydrogenated meta-xylene and a little ethylbenzene from the first step of hydrogenation back to the first step of hydrogenation.

19. The improvement according to claim 15 which further comprises recycling a part of the fraction containing non-hydrogenated meta-xylene from the second step of hydrogenation back into the first step of hydrogenation.

20. The improvement according to claim 10 wherein the conversion of ethylbenzene in the first step of the hydrogenation is between 50 and 90% and the total conversion of ethylbenzene after the second step of the hydrogenation is between 75 and 99%.

21. The improvement according to claim 20 wherein the conversion of ethylbenzene in the first step is between 65 and 85% and after the second step is between 88 and 98%.

22. The improvement according to claim 11 wherein the conversion of ethylbenzene in the first step of hydrogenation is between 50 and 90% and the total conversion of ethylbenzene after the second step of the hydrogenation is between 75 and 99%.

23. The improvement according to claim 22 wherein the conversion of ethylbenzene in the first step is between 65 and 85% and after the second step is between 88 and 98%.

24. The improvement according to claim 12 wherein the conversion of ethylbenzene in the first step of the hydrogenation is between 50 and 90% and the total conversion of ethylbenzene after the second step of the hydrogenation is between 75 and 99%.

25. The improvement according to claim 24 wherein the conversion of ethylbenzene in the first step is between 65 and 85% and after the second step is between 88 and 98%.

* * * * *